June 5, 1956      R. D. STOSBERG, JR      2,748,506
STRIPPING PLOW FOR UNCOVERING PIPE LINES OR THE LIKE
Filed Feb. 13, 1953      2 Sheets-Sheet 1
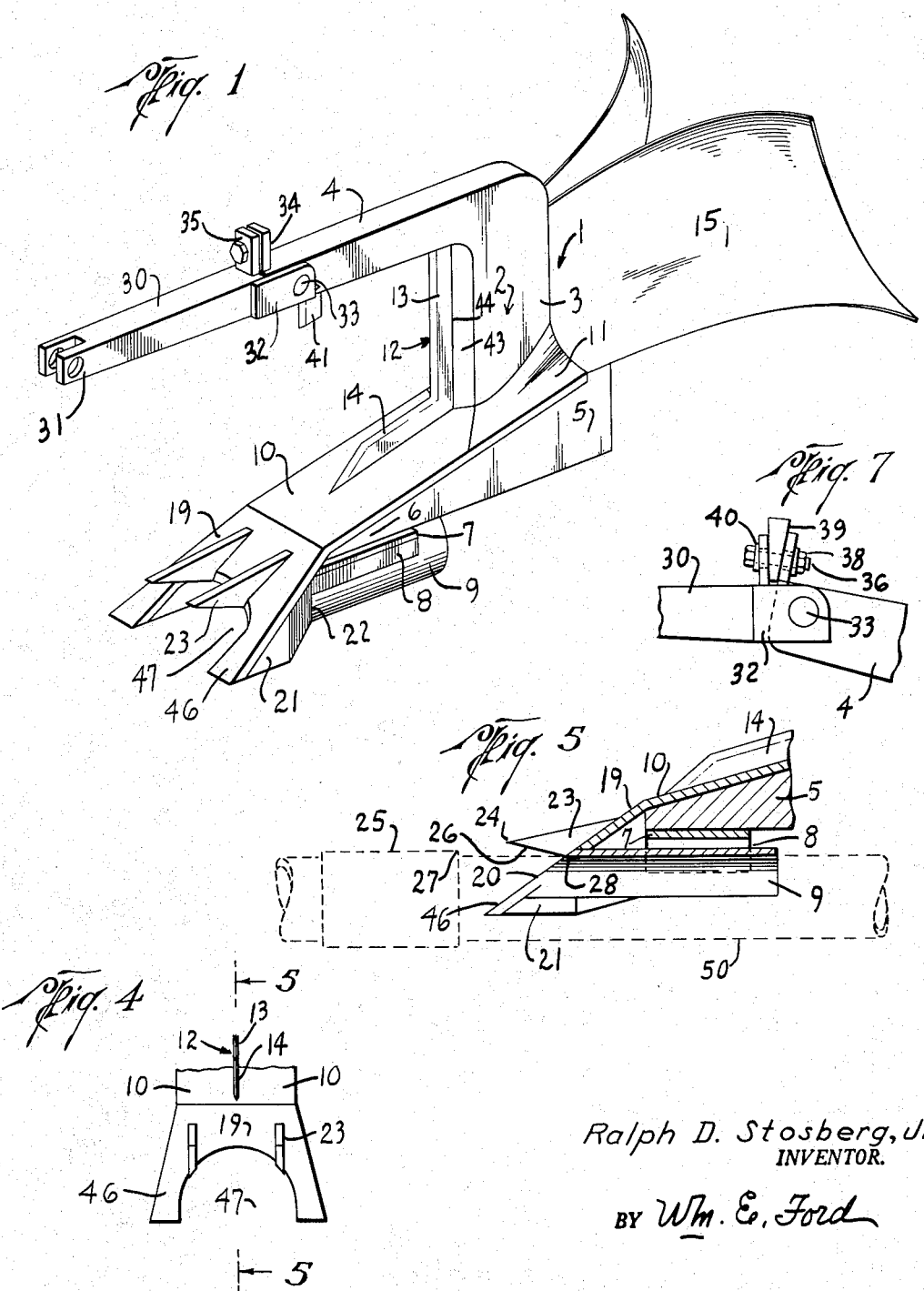
Ralph D. Stosberg, Jr.
INVENTOR.
BY Wm. E. Ford
ATTORNEY

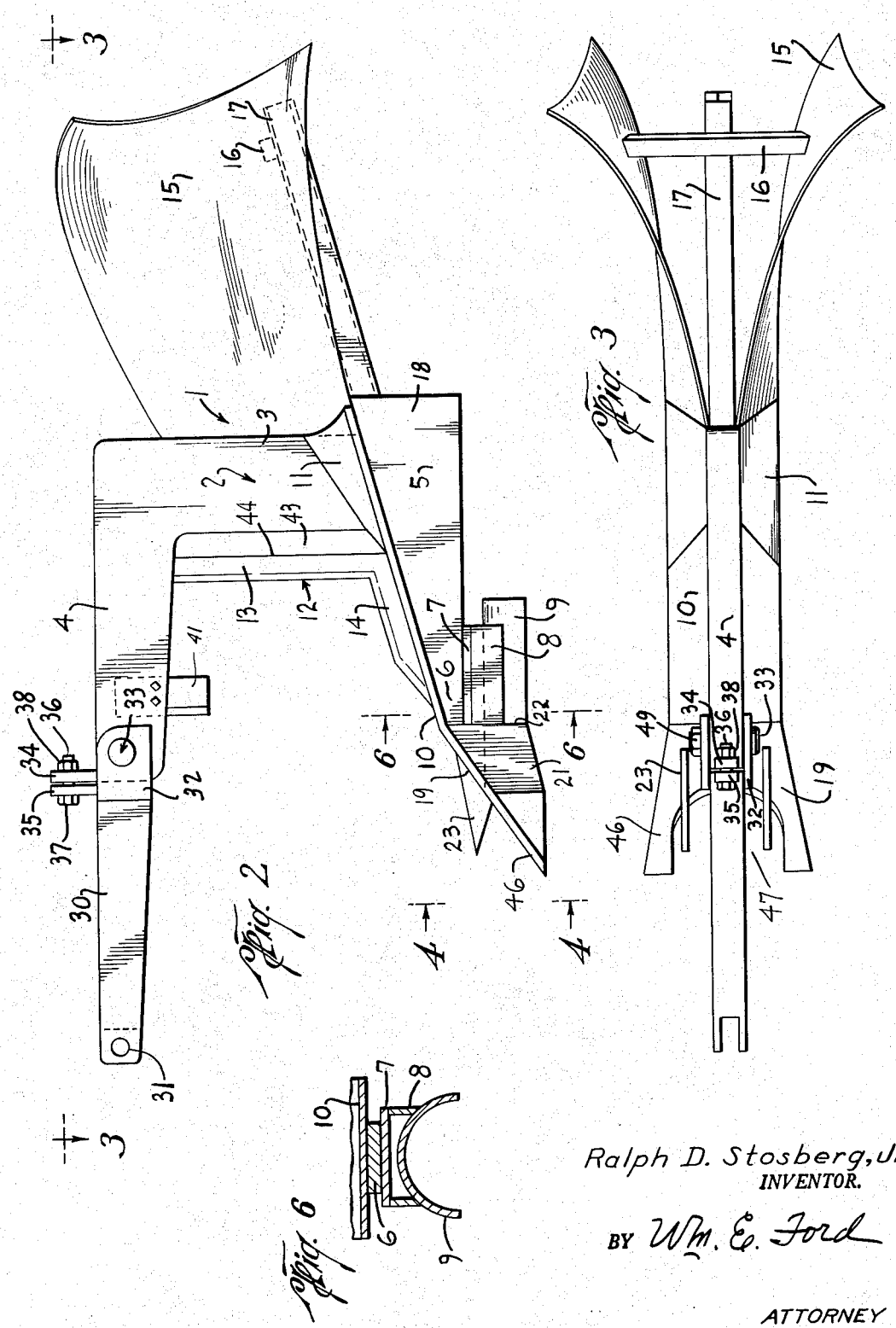

United States Patent Office 2,748,506
Patented June 5, 1956

2,748,506

STRIPPING PLOW FOR UNCOVERING PIPE LINES OR THE LIKE

Ralph D. Stosberg, Jr., Houston, Tex.

Application February 13, 1953, Serial No. 336,786

3 Claims. (Cl. 37—98)

This invention relates to a stripping plow for uncovering pipe lines or the like, which is adapted to ride upon the pipe line or similar object to be uncovered without completely encircling the line, and which is also adapted to traverse couplings or joints in a pipe line of larger diameter than the run of the line without interference with the stripping operation; such plow being adjustable to exert the maximum pull on pipe lines buried at varying depths; and such plow also being designed to displace a maximum amount of earth from over the buried object, as a pipe line.

It is an object of this invention to provide a stripping plow adapted to ride upon a buried object, as a pipe line, without completely encircling such object, while removing the maximum amount of earth from thereabove.

It is also an object of this invention to provide a stripping plow of this class which has adjustment means thereon so that the maximum effective pull may be exerted on the plow at varying depths of operation above a buried pipe line, with the result that stripping may be conducted effectively without risking that the plow may be pulled out of the earth.

It is still another object of this invention to provide a stripping plow of this class which has guide means thereon to guide the plow over the unions or couplings in the pipe line traversed without risking the undesired upward displacement of the plow upon traversing such a coupling or union.

It is yet a further object of this invention to provide a plow of this type having forwardly downwardly extending prongs on either side of the space into which the pipe is to extend, to thereby cut the over-burden to pass it on either side of the plow; the taper of the prongs insuring that the plow, when pulled while at ground level, will sink into the earth down to the pipe level to ride thereupon.

It is also another object of this invention to provide a plow of this type, which, since it does not encircle the pipe, may be easily removed from thereon to pass by obstructions, such as valves, cross-lines, or lines interconnecting into the line being stripped.

It is still a further object of this invention to provide a plow of this type, including a saddle to ride the pipe and prongs to extend on each side thereof, to thereby insure that the plow will stay on the pipe even though the prime mover may apply a pull upon the pipe angularly to the axis of the pipe.

It is yet another object of this invention to provide a plow of this type which has a beam clearance cutter or knife on the under side of the plow beam and substantially opposite the prongs on the base therebelow to split the over-burden as it starts to rise and turn the dirt to either side, thereby permitting the rear portion of the beam and top of the plow upright to move at substantially ground level in the case of the uncovering of deeply buried pipe.

It is a further object of this invention to provide a plow of this class which is designed to first deflect the earth upwardly from over the pipe line, the plow then being streamlined to deflect the earth sidewardly to an increasing extent as the plow is pulled along the pipe line by a prime mover, as a tractor.

It is still a further object of this invention to provide a plow of this class adjustable for operation over objects, as pipe lines, buried at varying depths, in which the adjustment means includes means to positively transmit the pull of the prime mover at whatever varying depths the plow may be adjustably set for operation.

Other and further objects will be apparent when the specification is considered in connection with the drawings, in which:

Figure 1 is a perspective view of the plow;
Fig. 2 is a side elevation of the plow;
Fig. 3 is a plan view of the plow taken along line 3—3 of Fig. 2;
Fig. 4 is a fragmentary front elevation of a portion of the plow taken along line 4—4 of Fig. 2;
Fig. 5 is a fragmentary sectional side elevation of the plow taken along line 5—5 of Fig. 4;
Fig. 6 is a transverse sectional elevation of the plow taken along line 6—6 of Fig. 2;
Fig. 7 is a fragmentary elevation of a portion of the beam of the plow when adjustably set to operate at a lesser depth than indicated in Figs. 1 and 2.

As best shown in Figs. 1, 2, and 3, the plow 1 comprises a body member 2 consisting of the upright portion 3 having the horizontally extending beam 4 at the top thereof and the tapered base portion 5 with the toe 6 at the forward end thereof. The crossplate 7 is welded beneath the toe 6 of the base 5, and from this crossplate the vertical members 8 extend downwardly to form a connection with the sides of a saddle member 9 of semi-circular cross section of considerable length and at least greater than the diameter of the pipe to be engaged or straddled by the saddle. This construction is shown in cross section in Fig. 6.

A shield or flat face plate 10 is connected to the inclined top surface of the toe 6 at a slow inclined plane for raising the over-burden and provides a flat face plate which is trussed or braced by the forwardly extending leg of the body member 2. It merges into side plates 11 which connect such shield to the upright 3 of the body 2. A streamlined angular knife edge 12 is provided, with the upper portion 13 connected to the upright 3 and the lower portion 14 connected to the shield 10.

To the rear of the upright 3, two wings 15 are provided, with the forward ends thereof connected to the upright and with the rear ends thereof curved outwardly, as best shown in Fig. 3. As a strength member, a cross brace 16 i provided to extend between the two wings 15, and as additional strength support the channel 17 is connected at its rear end to the lower end of the cross brace 16 and at its forward end to the heel 18 of the base 5.

The shield 10 has a downwardly sloped forward end or front plate 19 which is projected at a sharp or fast inclination defining an obtuse angle with the plate 10. This front plate 19 is connected on its under side to the downwardly sloping forward end 20 of the saddle 9 and which has the side gussets 21 which connect this element 19 to the saddle 9 at 22 and to the vertical member 8 and crossplate 7. These transversely spaced and longitudinally projected gussets or tie members 21 not only stiffen and back up the two side prongs of the front plate 19, but their bottom edge surfaces bear or drag on the ground on opposite sides of the longitudinal center line of the plow and below the displaced overburden and lend a stabilizing influence for assisting equilibrium during plow travel. Two spaced-apart triangular-shaped guide members 23 extend from the forward portion 19 of the shield 10 with the outwardly extending portion being at a slight angle upwardly to the horizontal so that, as shown in Fig. 5, the points 24 of such triangular members will clear a coupling or union 25 while the undersides 26 of such members 23 will contact the corner 27 of such coupling and guide the plow thereover without risking the possibility of the upper inner surface 28 of the saddle 9 lodging against such union or coupling 25.

It has been found with a plow of this type that the best pulling effect is provided when the line from the prime mover, as a tractor, not shown, extends horizontally from its connection to the plow, when the tractor pulls on the line to move the plow forward. If such line extends substantially horizontally, the plow will ride upon the pipe line or other object to be uncovered without the attendant risk of the upper end of the plow being pulled out of the earth. Conversely, if the line from prime mover to plow extends upwardly from the prime mover at too great an angle to the plow connection, there will be a tendency to cause the rear end of the plow to be tilted upwardly out of the earth.

In plows heretofore employed for the purpose of stripping objects, such as pipe lines, a sleeve has been provided to connect the plow to the pipe line or object to be uncovered, and such sleeve has extended all around the pipe line. Very unsuccessful results have been obtained by this construction, since the inherent inability to maintain an accurate, substantially horizontal pull on the plow, owing to variations in the depth the different portions of the line may be buried or to other factors, has resulted in the tendency to tilt the axis of the sleeve to the axis of the pipe line or object, with results that the sleeve binds on the pipe line or object, and tends to bend the pipe line or object, or itself tends to be bent. With such structure, breakage of the plow parts has often resulted, and otherwise breakage of the line between tractor and plow has occurred, with other accidents being attendant.

Since the elevation between the earth and the prime mover or tractor hitch is substantially constant, and since the plow must excavate pipe lines or objects buried at various depths so that the beam 4 thereof must extend at various vertical heights above the ground level, it has been found expedient to provide a beam connection 30 which may extend at an angle to the beam 4 of the body 2. Thus the clevis connection 31 between the plow and prime mover line may be positioned at substantially the same level above the ground as the point of line connection to the prime mover or tractor. To accomplish such a combination, the beam connection 30 has the side-plates 32 connected to the rear end thereof on each side to extend rearwardly beyond such rear end, to be trunnioned at 33 to the beam 4.

An upstanding plate 34 is connected to the forward end of the beam 4, and an upstanding plate 35 is connected to the rear end of the beam connection 30, and these plates have a line of slots therein, not shown but preferably of elliptical cross-section, with the major axis of the ellipse to extend verticaly. The connection bolt 36 may then be inserted through these elliptical slots or holes, so that the head 37 thereof may bear upon the forward face of the plate 35 and so that the nut 38, when threaded to the bolt 36, may bear upon the rear face of the plate 34 and complete a substantial connection between beam connection 30 and beam 4. When the beam connection 30 is to be pivoted at any desired angle, dependent upon the depth of the pipe line or object to be excavated, a suitable wedge 39, which has a hole therein to receive the bolt 36 therethrough, is inserted between the plates 34 and 35. Then tapered washers 40 may be employed with the nut and bolt, as shown in Fig. 7, with the result that when the nut 38 is tightened on the bolt 36, a substantially rigid connection between beam 4 and beam connection 30 is obtained without uneven stresses being placed upon the bolt 36.

As shown in Fig. 1, a knife 41 may be provided on the under surface of the beam 4 to extend therebelow. Such knife may be removably connected to the beam 4 by any conventional means, and knives of various lengths may be provided so as to extend into the earth at various working depths.

Because the forward shield section or portion 19 is tapered or has its side edges diverging downwardly to provide the prongs on either side of a cut-away space extending upwardly from the bottom edge of the wedge-shaped plate 19 and into which the pipe to be uncovered may extend, these prongs will extend deeper and deeper into the earth if a pull, beginning when the plow rests at ground level, is exerted on the pipe and the wedge shape co-operates with the side walls of the trench to resist upwardly displacing force.

Then, since the prongs extend downwardly on either side of the pipe, and since the saddle 9 rides the pipe for at least the top portion of its circumference, the plow will ride the pipe even though the pull exerted on the clevis end 31 of the beam connection 30 may be applied angularly to the axis of the pipe. The extended length of the saddle insures sliding contact with opposite sides of the pipe to insure travel of the plow along the pipe axis and resist any skewing effect if the direction of tractor pull happens not to exactly follow the buried pipe.

A feature which cannot be minimized is the fact that the knife 41, extending downwardly from the beam 4, will co-operate with the knife 12 to split the over-burden as it begins to be uplifted by the prongs of the front plate 19 and shield 10, and thus the rear end of the beam may be advanced at substantially ground level, or in cases even slightly below ground level, when deeply buried pipe is to be uncovered.

The trunnion on which the beam connection 30 is pivoted, indicated broadly at 33, may be a stud, unthreaded to receive the members 32, and threaded to engage the beam 4, or otherwise any conventional trunnion construction may be employed.

A plow of this type provides various features not heretofore employed in the prior art, and such plow has given the most excellent performance in the field, being able to uncover objects such as pipe lines at a faster speed than has been heretofore encountered, while at the same time displacing a maximum amount of earth without placing too great a working load on the prime mover. The triangular members 23 avoid any binding of the plow on unions or couplings; the knife edges and streamlined design of the forward part of the plow increase the displacement, as does the feature wherein the forward faces 43 of the upright 3 are tapered forwardly to converge at 44 with the upper portion 13 of the knife blade 12. Additionally, the streamlined side members 11 of the shield 10 add to the effective displacement sidewardly, and in great particularity the curvature of the wings 15 and their over-all effective design add appreciably to additionally displacing earth which has been penetrated by the forward portion of the plow.

Broadly this invention considers a stripping plow for uncovering pipe lines or the like, which is adapted to ride upon the object or pipe line without surrounding such line and being positively connected within limits thereto; such plow also being adapted to pass over enlargements in the line or objects, such as unions and couplings, without hanging up thereon; and such plow having means thereon whereby the position of its point of connection to the pulling means applied thereto may be vertically adjustable to accommodate the uncovering of objects buried at various depths below ground level. This invention also considers such a stripping plow which is of a rigid and durable construction and which is streamlined for a maximum displacement of earth per unit of pull exerted thereon.

What is claimed is:

1. A plow for stripping overburden from a buried pipe line, including a U-shaped frame set vertically on its side with its upper forwardly extending leg constituting a draw bar to which a pulling force is to be applied and its lower forwardly extending leg having a forwardly and downwardly inclined upper edge, a plate trussed by said lower leg and set by said inclined edge at a slow elevating angle for raising the overburden, a longitudinally extending semicylindrical pipe line engaging guide saddle below said lower leg and in partially overlapping relation to its forward nose portion and in forwardly projecting relation thereto, of an over-all length greater than the diameter of said pipe line to effectively co-operate with the opposite sides of the pipe line in resisting skewing of the plow relative to the pipe line axis, a front plate secured to the front of said saddle in a plane traverse thereto and extended upwardly and rearwardly to the forward edge of and at a faster inclination than the first mentioned plate and to make an obtuse angle with the first mentioned plate, said front plate having a saddle aligned opening and being of a width which increases downwardly in inverted wedge fashion to resist upward plow displacement.

2. A plow for uncovering pipe lines and the like, comprising, a body having an upright portion, a beam forwardly extending from the top of said upright portion and a forwardly and downwardly tapered base to which said upright portion is connected, a pair of wing members connected to extend rearwardly from said upright and flared outwardly from said connection, a semi-cylindrical saddle connected below the forward end of said base to ride upon a pipe line to be uncovered, a shield of greater transverse width than said body connected to the upper edge of said base and extended from said upright to the forward end of the base, an angularly disposed plate directed downwardly and forwardly from the front end of said shield and ahead of the saddle, said plate having downwardly divergent side edges and being cut away to provide a substantially semi-circular shaped aperture aligned with the saddle, guide means projected forwardly from said plate with the lower surface thereof extending forwardly and at an upward angle from the horizontal, a draw bar pivotally connected to said beam to extend forwardly therefrom and means to rigidly connect said draw bar to said beam at predetermined angles.

3. A stripping plow to be drawn behind a traction machine and to guide itself along a buried pipe line and loosen overburden through which the pipe line may thereupon be lifted, including a U-shaped main frame set vertically on its side with its upper and lower legs vertically spaced apart and extended in the direction of plow travel and whose cross-connecting bar is upright at the rear of the vertically spaced legs, the frame upper leg having a draft appliance connector forwardly spaced from said upright bar and the lower frame leg having its top edge inclined forwardly and downwardly from said upright bar, a transversely disposed wedge-shaped front plate positioned in an upwardly and rearwardly inclined plane disposed at an acute angle to the vertical and secured at the forward end of said lower leg, said plate being of a width greater than said lower leg to extend outwardly beyond both sides of said leg with upwardly convergent side edges to present its widest portion lowermost, said wedge plate having an upwardly extended central opening in the bottom edge thereof dividing the lower portion of the plate into a pair of pipe straddling and guide prongs, a pair of transversely spaced and longitudinally extending tie members joined forwardly to the side prongs of the wedge plate and joined rearwardly thereof to said lower leg with their bottom surfaces arranged for stabilizing slide bearing with the dirt engaged thereby on both sides of the frame longitudinal center line and a longitudinally projected plate positioned on said inclined top edge of said lower leg to extend rearwardly to said upright from the top of the wedge plate as a continuation thereof and at an obtuse angle thereto.

References Cited in the file of this patent

UNITED STATES PATENTS

| | | |
|---|---|---|
| 1,277,353 | Anderson | Sept. 3, 1918 |
| 1,910,481 | Smith | May 23, 1933 |
| 2,358,495 | Pace | Sept. 19, 1944 |
| 2,414,994 | Wright | Jan. 28, 1947 |
| 2,528,231 | Knapp | Oct. 31, 1950 |
| 2,620,715 | Silver et al. | Dec. 9, 1952 |
| 2,660,815 | Lippis | Dec. 1, 1953 |

FOREIGN PATENTS

| | | |
|---|---|---|
| 50,043 | Netherlands | Mar. 15, 1941 |